United States Patent
Shin et al.

(10) Patent No.: US 10,471,840 B2
(45) Date of Patent: Nov. 12, 2019

(54) APPARATUS AND METHOD FOR CONTROLLING LDC OF HYBRID VEHICLE

(71) Applicants: Hyundai Motor Company, Seoul (KR); Kia Motors Corporation, Seoul (KR)

(72) Inventors: Dong Jun Shin, Gyeonggi-do (KR); Ho Joong Lee, Gyeonggi-do (KR); Jun Yeon Park, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 129 days.

(21) Appl. No.: 15/710,413

(22) Filed: Sep. 20, 2017

(65) Prior Publication Data
US 2018/0162231 A1    Jun. 14, 2018

(30) Foreign Application Priority Data

Dec. 13, 2016   (KR) .................. 10-2016-0169641

(51) Int. Cl.
| | |
|---|---|
| *B60L 11/18* | (2006.01) |
| *B60W 20/13* | (2016.01) |
| *B60R 16/03* | (2006.01) |
| *B60L 58/18* | (2019.01) |
| *B60L 58/20* | (2019.01) |
| *B60L 53/20* | (2019.01) |
| *B60L 58/12* | (2019.01) |

(52) U.S. Cl.
CPC ........... *B60L 11/1868* (2013.01); *B60L 53/20* (2019.02); *B60L 58/12* (2019.02); *B60L 58/18* (2019.02); *B60L 58/20* (2019.02); *B60R 16/03* (2013.01); *B60W 20/13* (2016.01); *B60L 2240/545* (2013.01); *B60L 2240/547* (2013.01); *B60L 2240/549* (2013.01); *Y02T 10/7005* (2013.01); *Y02T 10/7216* (2013.01); *Y02T 90/16* (2013.01)

(58) Field of Classification Search
CPC .......... B60L 53/20; B60L 58/12; B60L 58/20; B60L 2210/10
See application file for complete search history.

(56) References Cited

U.S. PATENT DOCUMENTS

| | | | | |
|---|---|---|---|---|
| 9,849,793 | B2* | 12/2017 | Tashiro | H02J 7/0029 |
| 9,908,420 | B2* | 3/2018 | Lee | B60L 58/20 |
| 9,969,398 | B2* | 5/2018 | Shin | B60L 58/13 |
| 10,118,501 | B2* | 11/2018 | Kim | H02J 7/0054 |
| 2017/0297440 | A1* | 10/2017 | Hu | B60L 50/15 |

* cited by examiner

*Primary Examiner* — Todd M Melton
(74) *Attorney, Agent, or Firm* — Mintz Levin Cohn Ferris Glovsky and Popeo, P.C.; Peter F. Corless

(57) ABSTRACT

An apparatus and method for controlling an LDC of a hybrid vehicle are provided. The apparatus includes a determining controller that receives state information of an auxiliary battery, while the LDC is being operated in a first mode based on a detected voltage, and that determines whether an entry condition for a second mode based on a current is satisfied. An arithmetic controller calculates a charging current compensation value of the auxiliary battery when the entry condition for the second mode is satisfied and a mode controller enters the second mode and that controls the LDC based on the charging current compensation value of the auxiliary battery when the entry condition for the second mode is satisfied.

20 Claims, 11 Drawing Sheets

APPARATUS AND METHOD FOR CONTROLLING LDC OF HYBRID VEHICLE

CROSS-REFERENCE TO RELATED APPLICATION

This application is based on and claims the benefit of priority to Korean Patent Application No. 10-2016-0169641, filed on Dec. 13, 2016, in the Korean Intellectual Property Office, the disclosure of which is incorporated herein in its entirety by reference.

TECHNICAL FIELD

The present disclosure relates to an apparatus and method for controlling an LDC of a hybrid vehicle, and more particularly, to an apparatus and method for controlling an LDC of a hybrid vehicle that improve component efficiency of the LDC and minimize the number of times of charging and discharging while controlling convergence to a target SOC by controlling the LDC through current compensation.

BACKGROUND

A variable voltage controlling mode of a Low direct current-direct current (DC-DC) Converter (LDC) for a hybrid vehicle is performed to determine an output voltage of the LDC based on information regarding a state of charge (SOC) and temperature of a battery and to control the battery toward a target SOC based on a road driving condition and a vehicle state. However, such a variable voltage controlling mode of the LDC encounters frequent charging and discharging states of a battery, thereby causing energy dissipation, and degrading component efficiency of the battery or LDC.

SUMMARY

An aspect of the present disclosure provides an apparatus and method for controlling an LDC of a hybrid vehicle, capable of improving component efficiency of the LDC and minimizing the number of times of charging and discharging while controlling convergence to a target SOC by controlling the LDC through current compensation.

According to an aspect of the present disclosure, an apparatus for controlling a Low DC-DC Converter (LDC) of a hybrid vehicle may include a determining controller configured to receive state information of an auxiliary battery, while the LDC is being operated in a first mode based on a voltage, and configured to determine whether an entry condition for a second mode based on a current is satisfied, an arithmetic controller configured to calculate a charging current compensation value of the auxiliary battery when the entry condition for the second mode is satisfied, and a mode controller configured to enter the second mode and operate the LDC based on the charging current compensation value of the auxiliary battery when the entry condition for the second mode is satisfied.

The entry condition for the second mode may include an average current of the auxiliary battery, a state of charge (SOC) of the auxiliary battery, and a control priority of the LDC. The determining controller may be configured to determine that the entry condition for the second mode is satisfied when the average current of the auxiliary battery is maintained to be less than a reference value for a duration equal to or greater than a reference value, when the SOC of the auxiliary battery is greater than a reference value, and when the control priority of the LDC is less than a reference value. The arithmetic controller may be configured to calculate the charging current compensation value of the auxiliary battery based on a reference current value of the LDC and an average output current value of the LDC.

The arithmetic controller may output "0" as the charging current compensation value of the auxiliary battery when a value of subtracting the average output current value of the LDC from the reference current value of the LDC is less than 0. The arithmetic controller may be configured to calculate a charging current integration value of the auxiliary battery and a discharging current integration value of the auxiliary battery while the LDC is being operated in the second mode.

Further, the determining controller may be configured to determine whether to enter the LDC into a bust control state based on the charging current integration value of the auxiliary battery while the LDC is being operated in the second mode. The mode controller may be configured to operate the LDC in a burst control state when the charging current integration value of the auxiliary battery is determined as being greater than a reference value. The mode controller may then be configured to initialize the charging current compensation value of the auxiliary battery and the charging current integration value of the auxiliary battery while the LDC is in the burst control state.

The determining controller may also be configured to determine whether to release the LDC from the burst control state based on the discharging current integration value of the auxiliary battery while the LDC is in the burst control state. The mode controller may be configured to release the bust control state for the LDC when the discharging current integration value of the auxiliary battery is determined as being less than a reference value. The determining controller may be configured to determine whether an entry release condition for the second mode is satisfied while the LDC is being operated in the second mode.

The entry release condition for the second mode may include a target voltage variation of the LDC, an average current of the auxiliary battery, a state of charge (SOC) of the auxiliary battery, and a control priority of the LDC. The determining controller may be configured to determine that the entry release condition for the second mode is satisfied when the target voltage variation is greater than a reference value. The determining controller may further be configured to determine that the entry release condition for the second mode is satisfied unless at least one of the average current of the auxiliary battery, the SOC of the auxiliary battery, and the control priority of the LDC satisfies the entry condition for the second mode. The mode controller may then be configured to release the second mode and operate the LDC in the first mode when the entry release condition for the second mode is determined as being satisfied. The mode controller may be configured to variably adjust an output voltage of the LDC based on a road driving condition of a vehicle and a state of the vehicle when the LDC enters the first mode.

According to another aspect of the present disclosure, a method for controlling a Low DC-DC Converter (LDC) of a hybrid vehicle may include determining whether an entry condition for a second mode based on a current is satisfied by receiving state information regarding an auxiliary battery while the LDC is being operated in a first mode based on a voltage, entering the second mode when the entry condition for the second mode is satisfied, calculating a charging current compensation value of the auxiliary battery, and operating the LDC based on the charging current compensation value of the auxiliary battery.

BRIEF DESCRIPTION OF THE DRAWINGS

The above and other objects, features and advantages of the present disclosure will be more apparent from the following detailed description taken in conjunction with the accompanying drawings:

FIGS. 2A to 6 show features referral to description for an operation of an LDC controlling apparatus of a hybrid vehicle according to an exemplary embodiment of the present disclosure;

DETAILED DESCRIPTION

Figure 1:
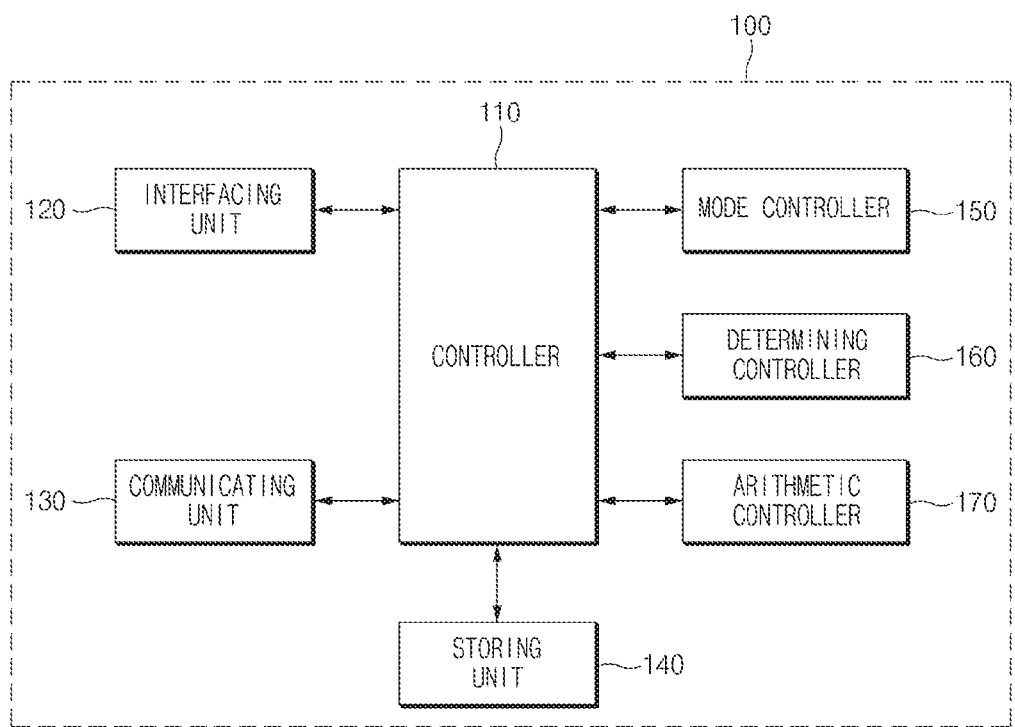
FIG. 1 illustrates a configuration of an LDC controlling apparatus of a hybrid vehicle according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referral to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present disclosure will be described in detail with reference to the accompanying drawings. In the drawings, the same reference numerals will be used throughout to designate the same or equivalent elements. In addition, a detailed description of well-known features or functions will be ruled out in order not to unnecessarily obscure the gist of the present disclosure.

Although the terms such as first, second, "A", "B", (a), (b), and so on may be used in describing exemplary embodiments of the present disclosure in detail, they are simply used for differentiating one from another elements and do not act for restricting the substances, sequences, or orders of their corresponding elements thereto. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 illustrates a configuration of an LDC controlling apparatus of a hybrid vehicle according to an exemplary embodiment of the present disclosure. An LDC controlling apparatus 100 of a hybrid vehicle according to the present disclosure (hereinafter referred to as "LDC controlling apparatus") may be formed in one body with internal controllers of the vehicle, or may be equipped as an independent component which is coupled with the controllers of the vehicle through a separate connection. The LDC controlling apparatus 100 may be configured to operate in relation with a battery management system (BMS) of a vehicle.

Referring to FIG. 1, the LDC controlling apparatus 100 may include a controller 110, an interfacing unit 120, a communicating unit 130, a storing unit 140, a mode controller 150, a determining controller 160, and an arithmetic controller 170. The controller 110 may be configured to process signals transmitted between the respective elements of the LDC controlling apparatus 100 and operate the units accordingly. The determining controller 160 and the arithmetic controller 170 may be separate controllers or may be integrated with the controller 110 as a single controller. Notably, in FIG. 1 the term "part" refers to the various components of the apparatus 100.

The interfacing unit 120 may include an input for receiving control instructions from a driver and an output for outputting operation states and results of the LDC controlling apparatus 100. The input may include key buttons, a mouse, a joystick, a jog-shuttle, a stylus pen, or the like but is not limited thereto. Additionally, the input may include soft keys which are implemented on a display.

The output may include a display, or may include a voice output such as speaker. When a touch sensor such as touch film, touch sheet, or touch pad is provided to a display, the display may operate as a touch screen or may be implemented in an integral structure with the input and output. In particular, the display may include at least one of a liquid crystal display (LCD), a thin film transistor liquid crystal display (TFT LCD), an organic light emitting diode (OLED), a flexible display, a field emission display (FED), and a three-dimensional (3D) display.

The communicating unit 130 may include a communication module for supporting a communication interface between electrical components and/or controllers which are equipped within the vehicle. As an example, the communication module may be configured to receive state information of an auxiliary battery, for example, information regarding SOC, temperature, voltage, and current, from a BMS within the vehicle. Additionally, the communicating unit 130 may be configured to receive state information of an LDC, for example, output current information of the LDC. Particularly, the communication module may include a module that supports vehicle network communication such as controller area network (CAN) communication, local interconnect network (LIN) communication, or flex-ray communication. Additionally, the communication module may include a module for wireless internet access or for short range communication.

The storing unit 140 may be configured to store data and/or algorithms necessary for operations of the LDC controlling apparatus 100. The storing unit 140 may be configured to store information received via the communicating unit 130. Additionally, the storing unit 140 may be configured to store information regarding a current control mode entry condition and information regarding a current control mode release condition, for the LDC. The storing unit 140 may further be configured to store instructions and/or algorithms for determining whether to enter into or release from a current control mode of the LDC and for executing mode operations of the LDC. In addition, the storing unit 140 may be configured to store algorithms for calculating a charging current compensation value of an auxiliary battery and for determining an output voltage of the LDC. In particular, the storing unit 140 may include a storage medium such as random access memory (RAM), static random access memory (SRAM), read-only memory (ROM), programmable read-only memory (PROM), or electrically erasable programmable read-only memory (EEPROM).

The mode controller 150 may be configured to operate the LDC in a first mode. The first mode may be a mode for operating the LDC based on a voltage, and may correspond to a variable voltage control mode. In particular, the first mode may be a mode set to a default value. When a control mode of the LDC is set to the first mode, the mode controller 150 may be configured to operate the LDC based on a voltage in a range of maintaining a target SOC based on a mad driving condition and a vehicle state. The determining controller 160 may be configured to determine whether a current battery state satisfies a second mode entry condition while the mode controller 150 is operating the LDC in the first mode.

Particularly, the second mode may be a mode for operating the LDC based on a current and may correspond to a current control mode. The second mode entry condition may include an average current of the auxiliary battery, a SOC of the auxiliary battery, and a control priority of the LDC. First, the determining controller 160 may be configured to compare an average current value of the auxiliary battery with a reference value. In particular, the arithmetic controller 170 may be configured to calculate an average current value of the auxiliary battery from the auxiliary battery state information received via the communicating unit 130. As an example, the arithmetic controller 170 may be configured to obtain about 50 samples of 3-second period from the auxiliary battery current information received via the communicating unit 130, and may then be configured to calculate an average current value of the auxiliary battery from the obtained samples.

The arithmetic controller 170 may be configured to transmit information regarding the calculated average current value of the auxiliary battery to the determining controller 160. Accordingly, the determining controller 160 may be configured to determine, as a first condition, whether the auxiliary battery average current value calculated by the arithmetic controller 170 is less than tne reference value. Additionally, the determining controller 160 may be configured to determine, as a second condition, whether the average current value of the auxiliary battery is maintained as less than the reference value for a duration that is equal to or greater than a reference time.

Figure 2:
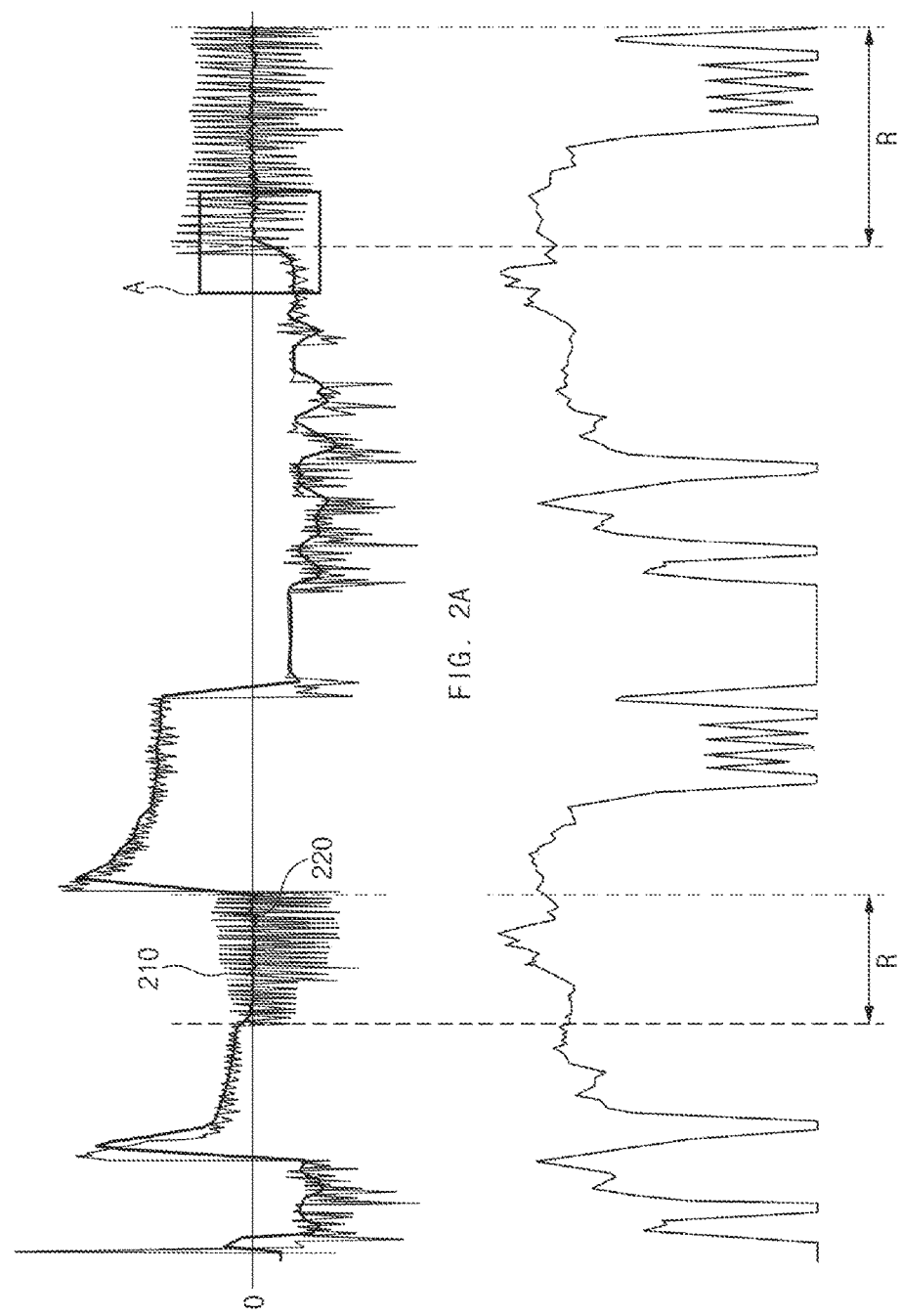
Figure 3:
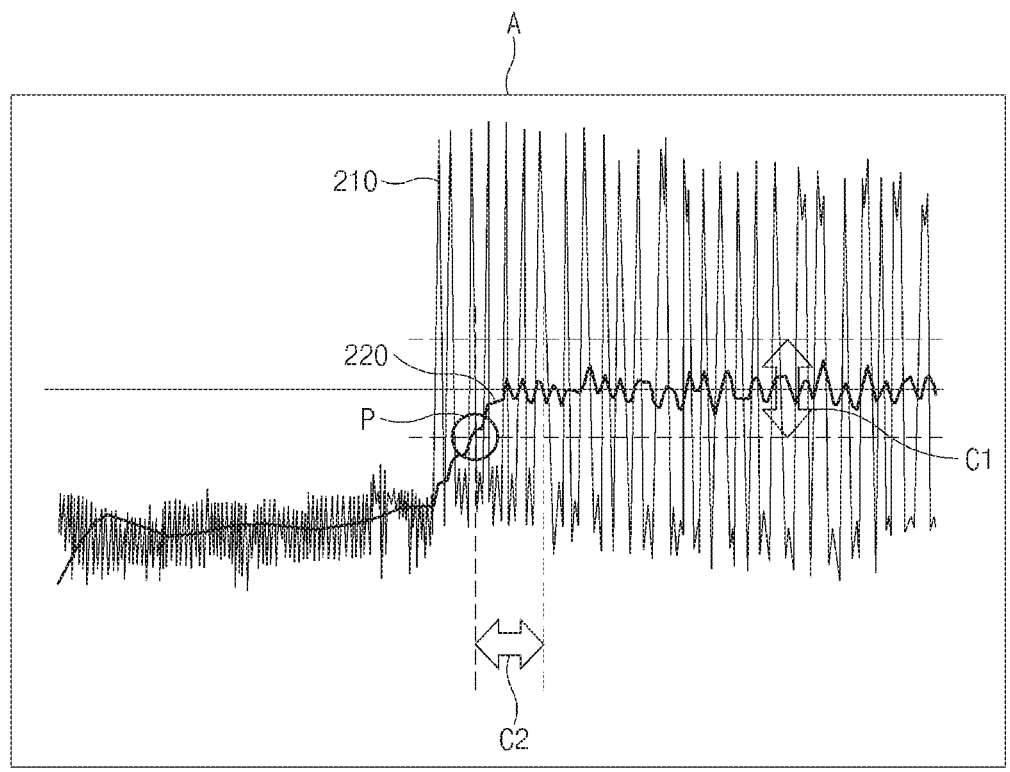

Detailed descriptions regarding the first and second conditions of the second mode entry condition will be provided with reference to FIGS. 2A, 2B, and 3. FIGS. 2A, 2B, and 3 show states of current of the auxiliary battery. In FIG. 2A, the reference numeral 210 indicates a current of the auxiliary battery and the reference numeral 220 indicates an average current. Additionally, FIG. 2B shows a vehicle velocity. To satisfy the first condition of the second mode entry condition, an average current value of the auxiliary battery must be less than a reference value. FIGS. 2A and 2B show that an average current of the auxiliary battery is uniformly maintained around a current level of 0 in the section R.

FIG. 3 shows a partial section of FIG. 2A in detail. In FIG. 3, C1 indicates a reference value of the first condition and C2 indicates a reference time of the second condition. In particular, FIG. 3 shows that an average current of the auxiliary battery satisfies the reference value of the first condition from the point "P" and a value of the average current is maintained in a duration equal to or greater than the reference time of the second condition from the point "P".

Additionally, the determining controller 160 may be configured to determine, as a third condition, whether an SOC of the auxiliary battery exceeds a reference value. The determining controller 160 may also be configured to determine, as a fourth condition, whether a control priority of the LDC is less than a reference value. Particularly, the determining controller 160 may be configured to determine that the second mode entry condition is satisfied when the first to fourth conditions are all satisfied.

When the first to fourth conditions of the second mode entry condition are determined as being all satisfied, the mode controller 150 may be configured to change a control mode of the LDC to the second mode. The arithmetic controller 170 may be configured to calculate an average output current value of the LDC when the control mode of the LDC is changed to the second mode. Additionally, the arithmetic controller 170 may be configured to calculate a charging current compensation value "C" of the auxiliary battery by reflecting the calculated average output current value of the LDC. The charging current compensation value "C" of the auxiliary battery may be calculated using Equation 1 as follows $$C = \{I_{LDC \cdot ref} - I_{LDC \cdot mean}\} \times G \qquad \text{Equation 1}$$

In Equation 1, "C" denotes a charging current compensation value of the auxiliary battery, $I_{LDC \cdot ref}$ denotes a reference current value of the LDC, $I_{LDC \cdot mean}$ denotes an average output current value of the LDC, and "G" denotes a gain value. The arithmetic controller 170 may output C=0 when $I_{LDC \cdot ref} - I_{LDC \cdot mean} < 0$, and may output a "C" value calculated through Equation 1 unless $I_{LDC \cdot ref} - I_{LDC \cdot mean} < 0$.

The mode controller 150 may be configured to operate the LDC based on a current in a range of maintaining a target SOC by reflecting the auxiliary battery charging current compensation value, which is calculated by the arithmetic controller 170, to a reference charging current value of the auxiliary battery. In particular, the mode controller 150 may be configured to determine an output voltage of the LDC based on the calculated charging current compensation value of the auxiliary battery. The determining controller 160 may be configured to determine whether to enter the LDC into a bust control state based on a charging current integration value of the auxiliary battery while the mode controller 150 is operating the LDC in the second mode.

Particularly, the charging current integration value of the auxiliary battery may be calculated by the arithmetic controller 170. In other words, the arithmetic controller 170 may be configured to calculate the charging current integration value of the auxiliary battery while the mode controller 150 is operating the LDC in the second mode. The determining controller 160 may be configured to determine that the LDC enters the burst control state when the auxiliary battery charging current integration value calculated by the arithmetic controller 170 is greater than a reference value. The burst control state indicates a state of conditioning power consumption to be 0 by preventing voltage conversion since pulse width modulation (PWM) of the LDC is turned off. Accordingly, the mode controller 150 may be configured to turn off the PWM of the LDC when the determining controller 160 determines that the LDC enters the bust control. In particular, the mode controller 150 does not perform current compensation control for the LDC.

Figure 4:
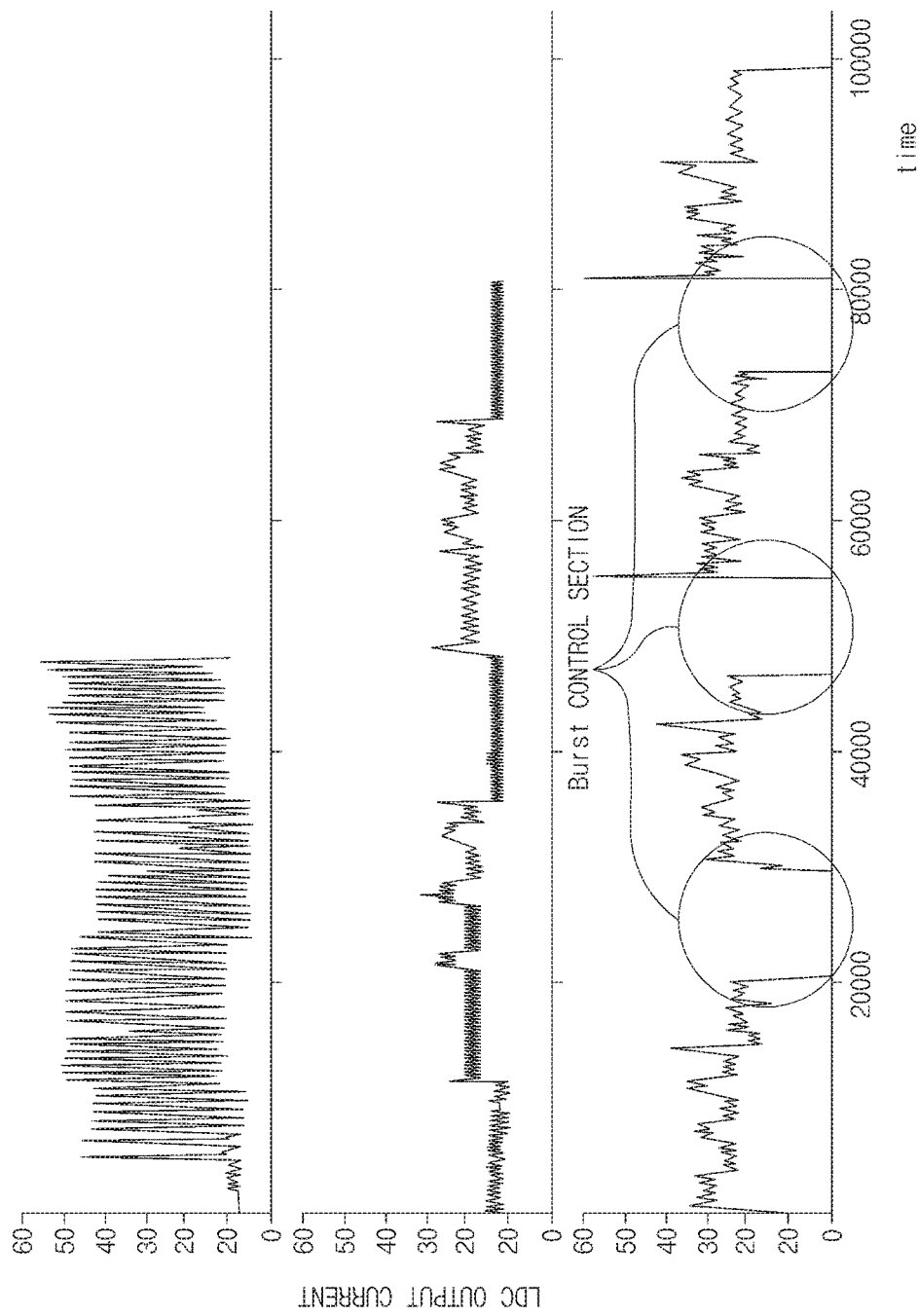

An exemplary embodiment of an operation for entering the burst control state during the current compensation control of the LDC will be described in conjunction with FIG. 4. Referring to FIG. 4, an output current of the LDC becomes "0" in a burst control section. In particular, the mode controller 150 may be configured to initialize the auxiliary battery charging current compensation value, calculated by the arithmetic controller 170, and a charging current integration value of the auxiliary battery when the LDC enters the burst control state while the LDC is being operated under the current compensation control. Additionally, the determining controller 160 may be configured to determine whether to enter the LDC into a state of the current compensation control based on a discharging current integration value of the auxiliary battery after the LDC entered the burst control state.

Further, the discharging current integration value of the auxiliary battery may be calculated by the arithmetic controller 170. In other words, the arithmetic controller 170 may be configured to calculate the discharging current integration value of the auxiliary battery when the LDC enters the burst control state. The determining controller 160 may be configured to determine that the LDC reenters the current compensation control when the auxiliary battery discharging current integration value calculated by the arithmetic controller 170 is less than a reference value. Accordingly, the mode controller 150 may be configured to operate the LDC based on the charging current compensation value of the auxiliary battery when the determining controller 160 determines that the LDC enters the current compensation control.

In the meantime, the determining controller 160 may be configured to determine whether a second mode entry release condition is satisfied while the mode controller 150 is operating the LDC in the second mode. Particularly, the second mode entry release condition may include all of the second mode entry release conditions. Additionally, the second mode entry release condition may include a target voltage variation of the LDC. The determining controller 160 may be configured to determine whether the target voltage variation is greater than a reference value. Accordingly, the mode controlling mode 150 may be configured to release the second mode and change the control mode of the LDC to the first mode when the target voltage variation of the LDC is determined as being greater than the reference value.

Figure 5A:
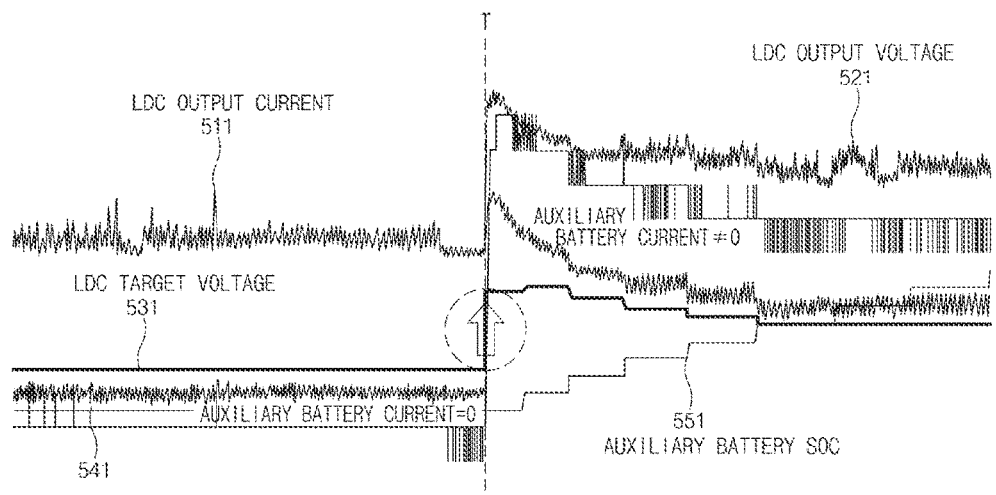
Figure 5B:
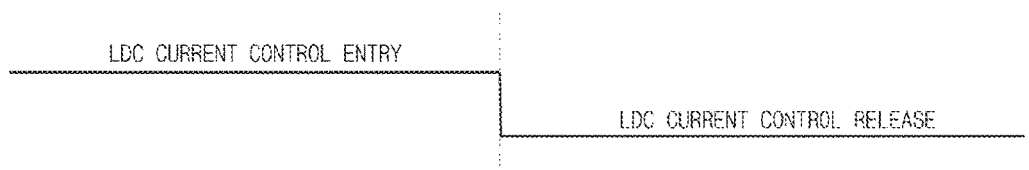

The second mode entry release condition will be detailed by referring to an exemplary embodiment of FIGS. 5A and 5B. Referring to FIGS. 5A and 5B, FIG. 5A shows a target voltage variation feature of the LDC and FIG. 5B shows states of entering or releasing the second mode that is the current control mode. In FIG. 5A, the reference numeral 511 indicates an output current of the LDC, the reference numeral 521 indicates an output voltage of the LDC, the reference numeral 531 indicates a target voltage of the LDC, the reference numeral 541 indicates a charging current of the auxiliary battery, and the reference numeral 551 indicates an SOC of the auxiliary battery.

As shown in FIG. 5A, the target voltage of the LDC is uniformly maintained before the time "T". In addition, as shown in FIG. 5B, the mode controller 150 may be configured to maintain the control mode of the LDC in the second mode. In the meantime, FIG. 5A shows that the target voltage of the LDC rapidly increases at the time 'T' and a target voltage variation of the LDC increases accordingly. Thus, when the target voltage variation of the LDC becomes greater than a reference value, the mode controller 150 may be configured to release the second mode as shown in FIG. 5B.

Figure 6:
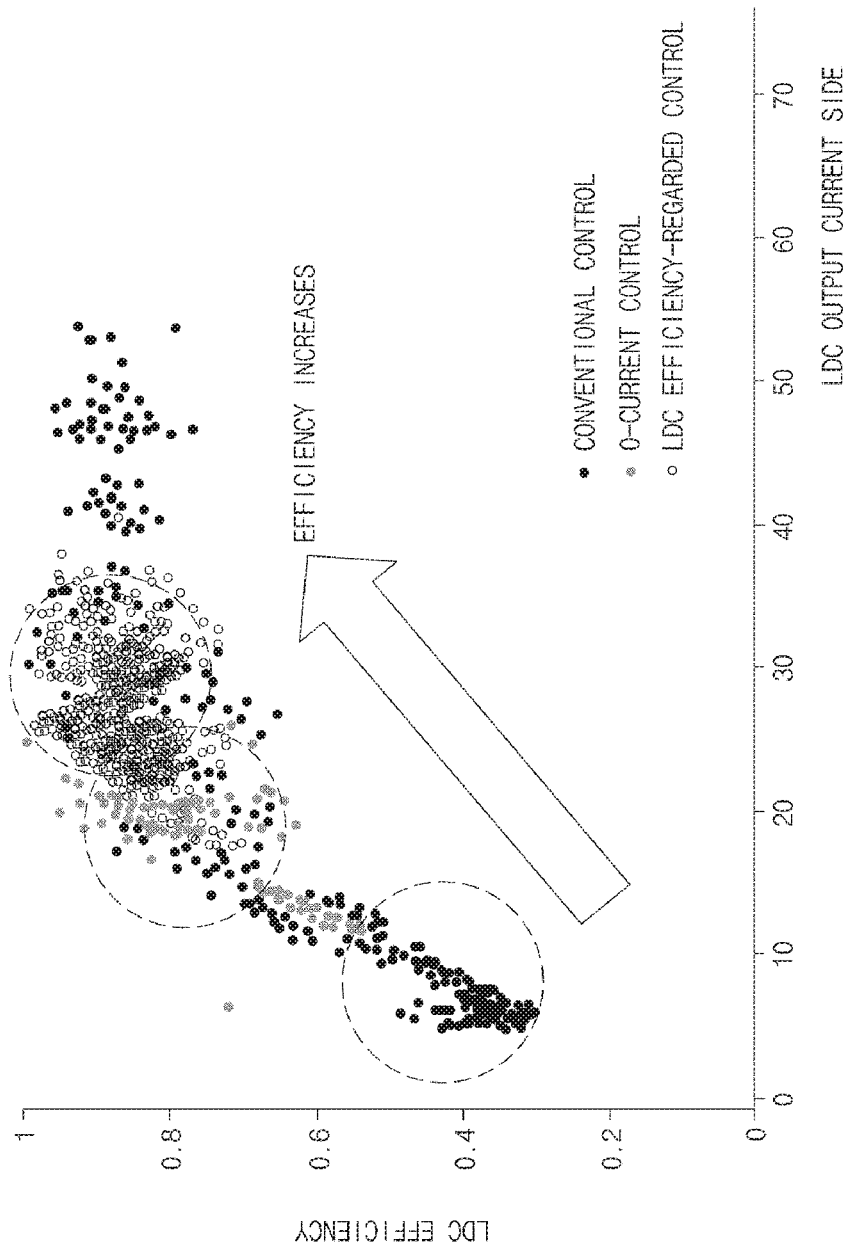

Additionally, the determining controller 160 may be configured to determine whether the first to fourth conditions of the second mode entry condition are all satisfied. The mode controller 150 may then be configured to release the second mode and change the control mode of the LDC to the first mode if even one of the first to fourth conditions of the second mode entry condition is determined as not being satisfied. The efficiency of the LDC by the LDC controlling apparatus 100 for a hybrid vehicle, according to an exemplary embodiment of the present disclosure, is comparatively shown in FIG. 6. Accordingly, the LDC controlling apparatus 100 for a hybrid vehicle according to an exemplary embodiment of the present disclosure may perform the current compensation control and may improve the efficiency of the LDC by changing the control mode to another mode when a specific condition is dissatisfied.

An operational flow of the LDC controlling apparatus, which is formed as described above, according to the present disclosure, will be described as follows. FIGS. 7 to 10 show a flow of operations of a method for controlling an LDC of a hybrid vehicle according to an exemplary embodiment of the present disclosure.

Figure 7:
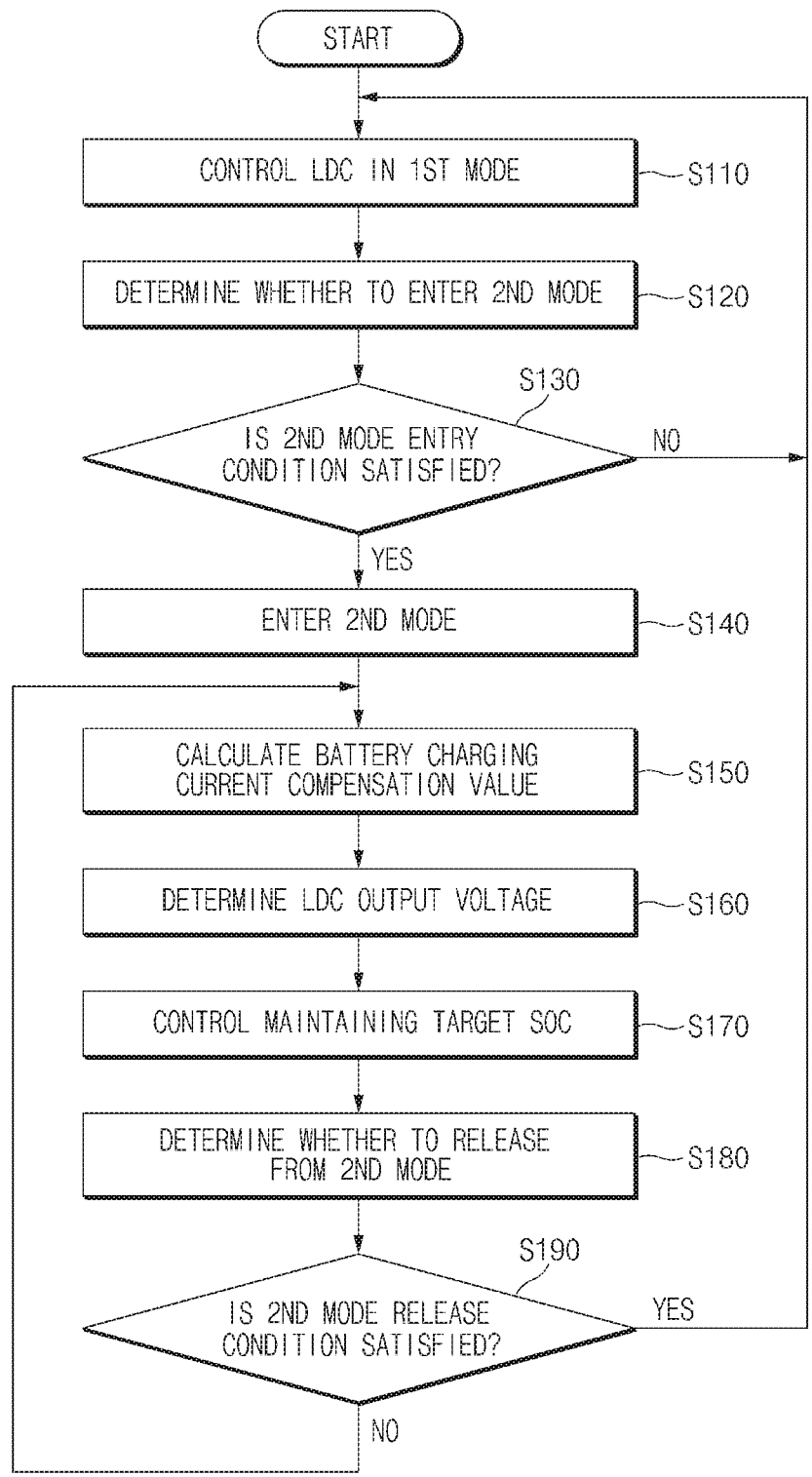
FIGS. 7 to 10 show a flow of operations of a method for controlling an LDC of a hybrid vehicle according to an exemplary embodiment of the present disclosure.

First, referring to FIG. 7, the LDC controlling apparatus 100 may be configured to operate the LDC in a range of maintaining a target SOC based on a road driving condition and a vehicle state when the control mode of the LDC is set to the first mode (S110). The LDC controlling apparatus 100 may be configured to determine whether to enter the LDC into the second mode while the LDC is being operated in the first mode (S120), and the LDC controlling apparatus 100 may be configured to enter the second mode (S140) when the second mode entry condition is satisfied (S130).

Figure 8:
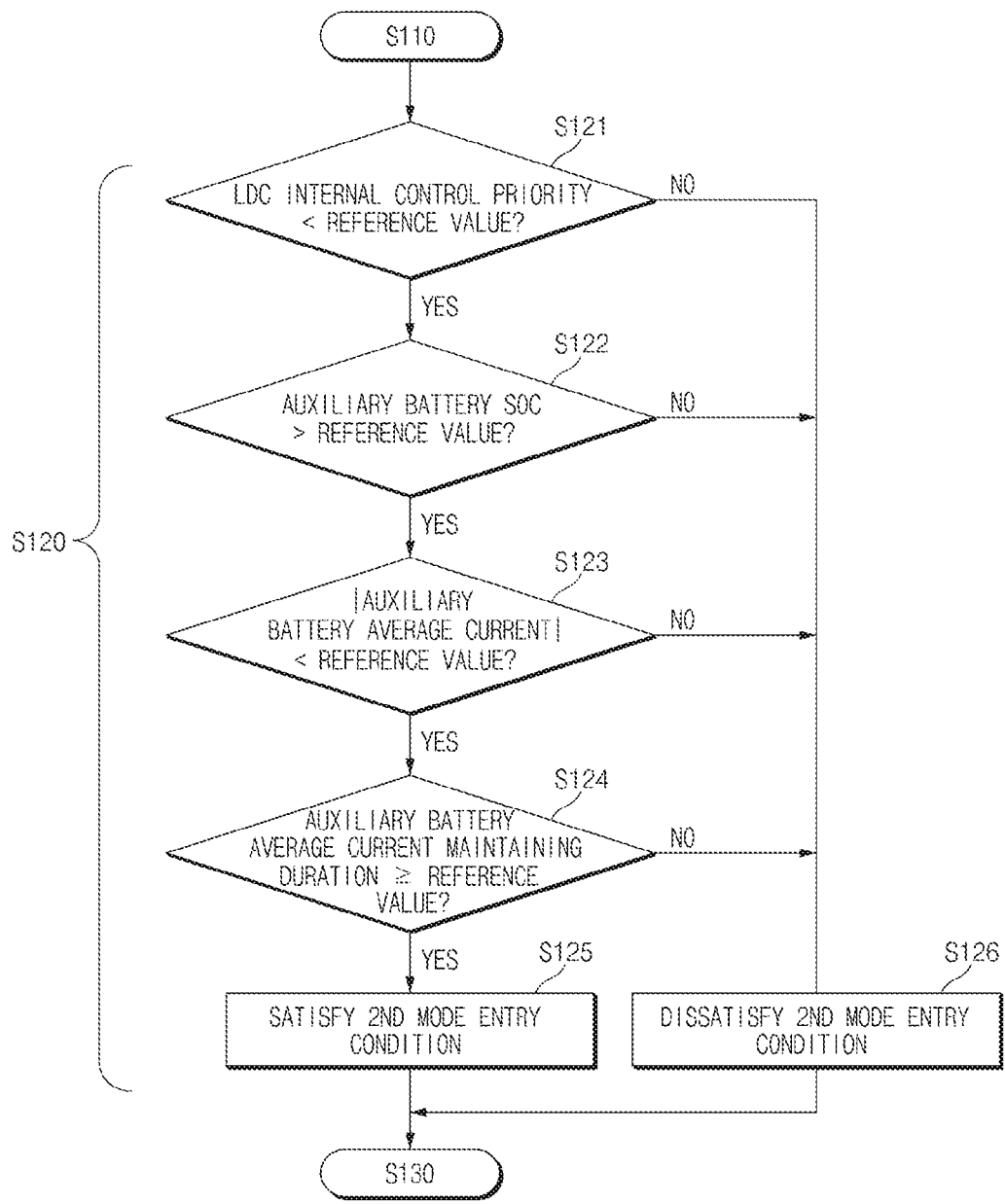

An operation of determining the second mode entry condition in operation S120 will be more detailed in conjunction with FIG. 8. Referring to FIG. 8, the LDC controlling apparatus 100 may be configured to determine whether reference conditions are satisfied by comparing a control priority of the LDC, an SOC of the auxiliary battery, and an average current value and an average current maintaining duration of the auxiliary battery with their respective values (S121 to S124). In particular, the LDC controlling apparatus 100 may be configured to determine that the second mode entry condition is satisfied when the control priority of the LDC is less than a reference value, when the SOC of the auxiliary battery is greater than a reference value, and when the average current value of the auxiliary battery is maintained less than a reference value for a duration equal to or greater than a reference time (S125). In the meantime, the LDC controlling apparatus 100 may be configured to determine that the second mode entry condition is dissatisfied unless even one of the control priority of the LDC, the SOC of the auxiliary battery, and the average current value, and the average current maintaining duration of the auxiliary battery is satisfied (S126).

When the LDC controlling apparatus 100 enters the second mode in operation S140, the LDC controlling apparatus 100 may be configured to calculate a charging current compensation value of the auxiliary battery (S150) and determine an output voltage of the LDC based on the calculated charging current compensation value of the auxiliary battery (S160). Further, the LDC controlling apparatus 100 may then be configured to operate the LDC in a range of maintaining a target SOC (S170). The LDC controlling apparatus 100 may be configured to determine whether to enter the LDC into the second mode while the LDC is being operated in the second mode (S180) and may be configured to release the second mode when the second mode release condition is satisfied (S190).

Figure 9:
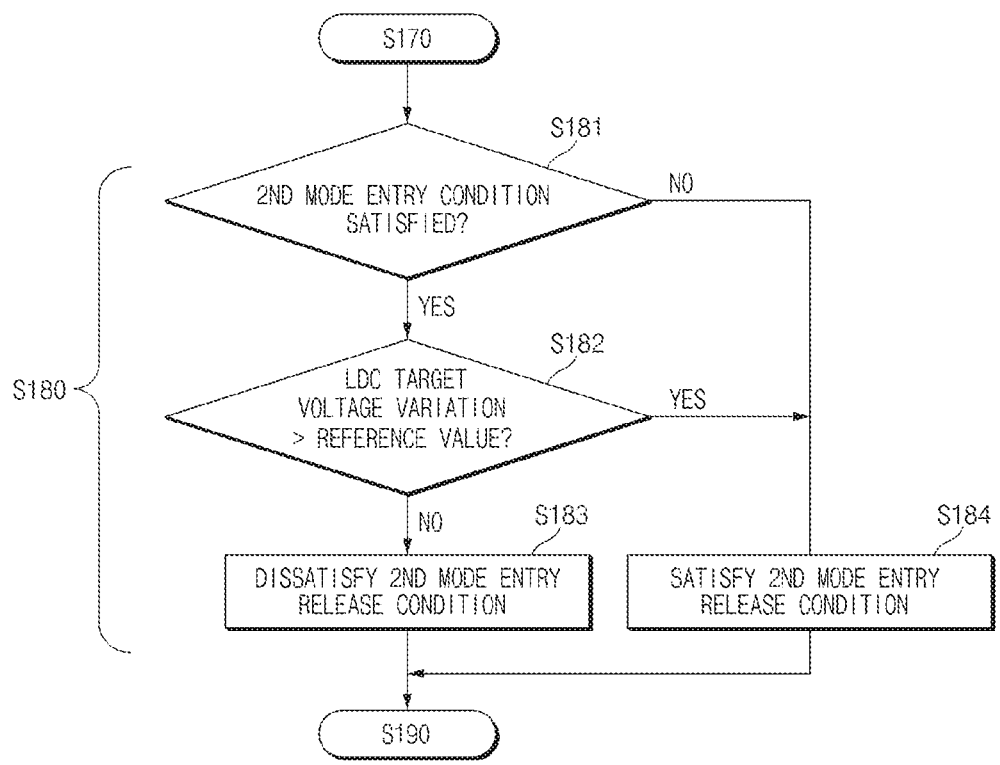

An operation of determining the second mode release condition in S180 will be further described in conjunction with FIG. 9. Referring to FIG. 9, the LDC controlling apparatus 100 may be configured to determine whether reference conditions are satisfied by comparing the second mode entry condition and the target voltage variation of the LDC with their respective reference values (S181 and S182). In particular, the LDC controlling apparatus 100 may be configured to determine that the second mode release condition is satisfied unless even one of the second mode entry conditions is satisfied (S184). Additionally, the LDC controlling apparatus 100 may be configured to determine that the second mode release condition is satisfied when the target voltage variation of the LDC is greater than a reference value (S184). In the meantime, the LDC controlling apparatus 100 may be configured to determine that the second mode release condition is dissatisfied when all the second mode entry conditions are satisfied and unless the target voltage variation of the LDC is greater than the reference value (S183). In connection with operation 180, the LDC controlling apparatus 100 may repeat operation 150 to operation 190 when the second mode release condition is determined as being dissatisfied.

Figure 10:
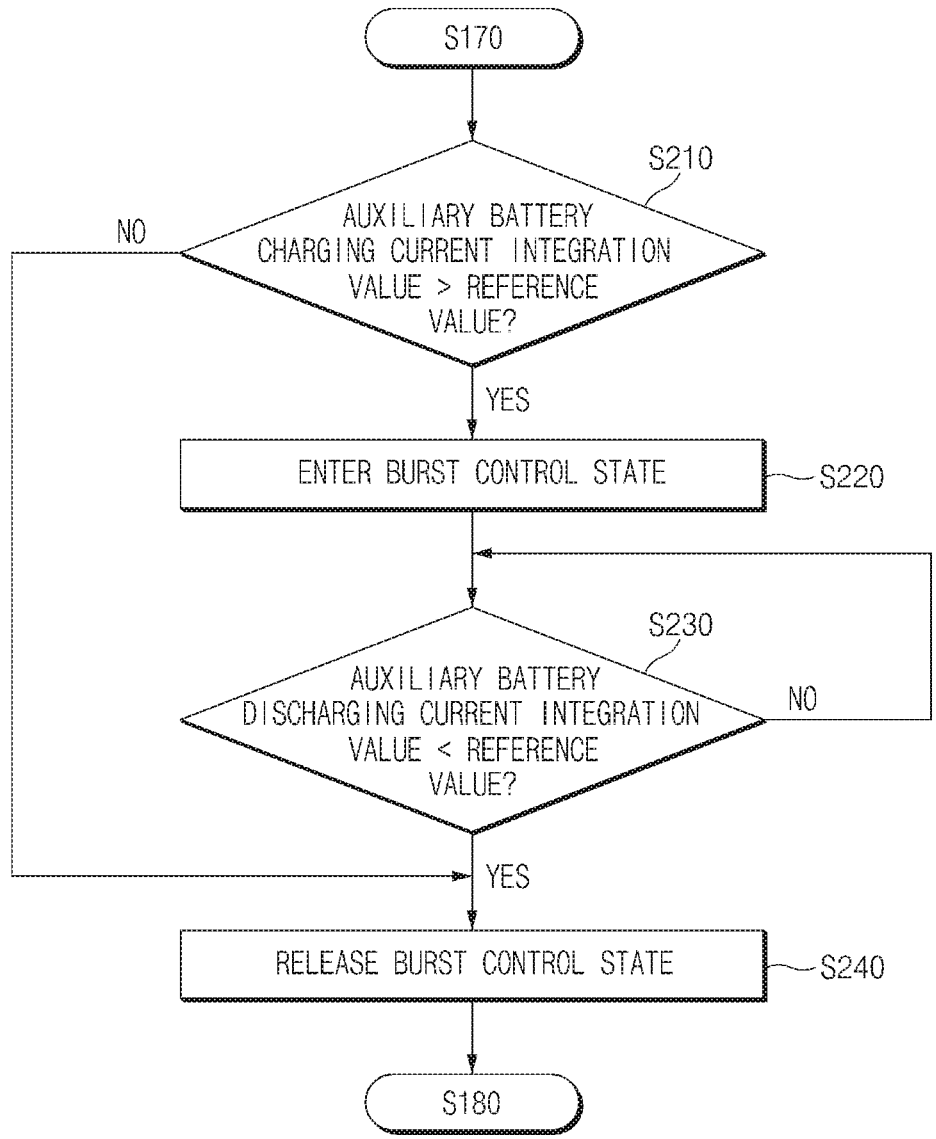

Furthermore, the LDC controlling apparatus 100 may be configured to determine whether to enter the LDC into a burst control state while the LDC is being operated in the second mode. This will be described in conjunction with FIG. 10. Referring to FIG. 10, the LDC controlling apparatus 100 may be configured to determine whether to enter the LDC into the burst control state based on a charging current integration value of the auxiliary battery while the LDC is being operated in the second mode.

In particular, the LDC controlling apparatus 100 may be configured to operate the LDC by entering the burst control state (S220) when the charging current integration value of the auxiliary battery is greater than a reference value (S210). When the LDC enters the burst control state through operation S220, the LDC controlling apparatus 100 may be configured to calculate a discharging current integration value of the auxiliary battery and determine whether to release the LDC from the burst control state based on the calculated discharging current integration value of the auxiliary battery. The LDC controlling apparatus 100 may be configured to perform current compensation control for the LDC by releasing the burst control state (S240) when the discharging current integration value of the auxiliary battery is less than a reference value (S230).

Figure 11:
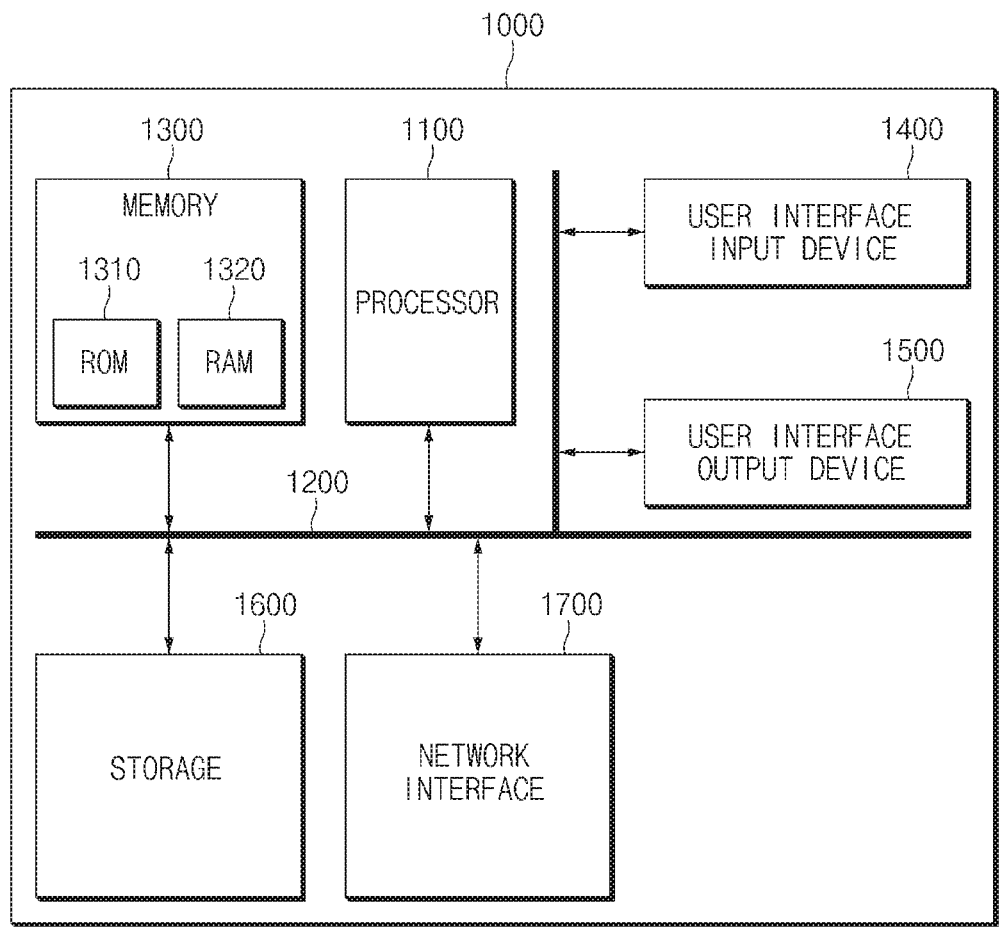
FIG. 11 illustrates a configuration of a computing system executing a method according to an exemplary embodiment of the present disclosure.

The LDC controlling apparatus 100 operating as described above, according to exemplary embodiments of the present disclosure, may be implemented in a form of independent hardware structure and may be driven in such a way that the LDC controlling apparatus 100 is included in another hardware device such as microprocessor or universal computing system as at least one or more processors. FIG. 11 illustrates a configuration of a computing system executing a method according to an exemplary embodiment of the present disclosure. Referring to FIG. 11, a computing system 1000 may include at least one processor 1100, a memory 1300, a user interface input unit 1400, a user interface output unit 1500, a storage 1600, and a network interface 1700, all of which are connected via a bus 1200.

The processor 1100 may be a central processing unit (CPU) or a semiconductor device executing instructions stored in the memory 1300 and/or the storage 1600. The memory 1300 and the storage 1600 may include various types of volatile or nonvolatile storage media. For example, the memory 1300 may include a read only memory (ROM) and a random access memory (RAM). Accordingly, the operations of a method or algorithm described in connection with the exemplary embodiments disclosed herein may be embodied directly in hardware, in a software module executed by the processor 1100, or in a combination of the two.

A software module may be even resident in a storage medium (i.e., the memory 1300 and/or the storage 1600) such as RAM, flash memory, ROM, EPROM, EEPROM, register, hard disk, removable disk, or CD-ROM. An exemplary storage medium may be coupled with the processor 1100, and the processor 1100 may read information from the storage medium and write information into the storage medium. Alternatively, the storage medium may be integrated into the processor 1100. The processor and the storage medium may be even resident in an application specific integrated circuit (ASIC). Such an ASIC may be embedded in a user terminal. Alternatively, the processor and the storage medium may be even resident as individual components in a user terminal. According to exemplary embodiments of the present disclosure, it may be effective in improving the efficiency of an LDC and minimizing the number of times of charging and discharging, even while controlling the LDC toward a target SOC, by operating the LDC using current compensation.

The description above is merely provided to exemplify the technical concept of the present disclosure and may be modified or altered by those skilled in the art without departing from the essential substance of the present disclosure. Therefore, the exemplary embodiments disclosed in the present disclosure are provided for the sake of descriptions, not limiting the technical concepts of the present disclosure, and it should be understood that such exemplary embodiments are not intended to limit the scope of the technical concepts of the present disclosure. The protection scope of the present disclosure should be understood by the claims below, and all the technical concepts within the equivalent scopes should be interpreted to be within the scope of the right of the present disclosure.

What is claimed is:

1. An apparatus for controlling a low direct current-direct current (DC-DC) Converter (LDC) of a hybrid vehicle, comprising:
   a determining controller configured to receive state information of an auxiliary battery, while the LDC is being operated in a first mode based on a detected voltage and determine whether an entry condition for a second mode based on a current is satisfied;
   an arithmetic controller configured to calculate a charging current compensation value of the auxiliary battery when the entry condition for the second mode is satisfied; and
   a mode controller configured to enter the second mode and to operate the LDC based on the charging current compensation value of the auxiliary battery when the entry condition for the second mode is satisfied.

2. The apparatus according to claim 1, wherein the entry condition for the second mode includes an average current of the auxiliary battery, a state of charge (SOC) of the auxiliary battery, and a control priority of the LDC.

3. The apparatus according to claim 2, wherein the determining controller is configured to determine that the entry condition for the second mode is satisfied when the average current of the auxiliary battery is maintained less than a reference value for a duration equal to or greater than a reference time, when the SOC of the auxiliary battery is greater than a reference value, and when the control priority of the LDC is less than a reference value.

4. The apparatus according to claim 1, wherein the arithmetic controller is configured to calculate the charging current compensation value of the auxiliary battery based on a reference current value of the LDC and an average output current value of the LDC.

5. The apparatus according to claim 4, wherein the arithmetic controller is configured to output 0 as the charging current compensation value of the auxiliary battery when a value of subtracting the average output current value of the LDC from the reference current value of the LDC is less than 0.

6. The apparatus according to claim 1, wherein the arithmetic controller is configured to calculate a charging current integration value of the auxiliary battery and a discharging current integration value of the auxiliary battery while the LDC is being operated in the second mode.

7. The apparatus according to claim 6, wherein the determining controller is configured to determine whether to enter the LDC into a burst control state based on the charging current integration value of the auxiliary battery while the LDC is being operated in the second mode.

8. The apparatus according to claim 7, wherein the mode controller is configured to operate the LDC in a burst control state when the charging current integration value of the auxiliary battery is determined as being greater than a reference value.

9. The apparatus according to claim 8, wherein the mode controller is configured to initialize the charging current compensation value of the auxiliary battery and the charging current integration value of the auxiliary battery while the LDC is in the burst control state.

10. The apparatus according to claim 8, wherein the determining controller is configured to determine whether to release the LDC from the burst control state based on the discharging current integration value of the auxiliary battery while the LDC is in the burst control state.

11. The apparatus according to claim 10, wherein the mode controller is configured to release the burst control state for the LDC when the discharging current integration value of the auxiliary battery is determined as being less than a reference value.

12. The apparatus according to claim 1, wherein the determining controller is configured to determine whether an entry release condition for the second mode is satisfied while the LDC is being operated in the second mode.

13. The apparatus according to claim 12, wherein the entry release condition for the second mode includes a target voltage variation of the LDC, an average current of the auxiliary battery, a State of charge (SOC) of the auxiliary battery, and a control priority of the LDC.

14. The apparatus according to claim 13, wherein the determining controller is configured to determine that the entry release condition for the second mode is satisfied when the target voltage variation is greater than a reference value.

15. The apparatus according to claim 13, wherein the determining controller is configured to determine that the entry release condition for the second mode is satisfied unless at least one of the average current of the auxiliary battery, the SOC of the auxiliary battery, and the control priority of the LDC satisfies the entry condition for the second mode.

16. The apparatus according to claim 12, wherein the mode controller is configured to release the second mode and operate the LDC in the first mode when the entry release condition for the second mode is determined as being satisfied.

17. The apparatus according to claim 1, wherein the mode controller is configured to variably adjust an output voltage of the LDC based on a road driving condition of a vehicle and a state of the vehicle when the LDC enters the first mode.

18. A method for controlling a low direct current-direct current (DC-DC) Converter (LDC) of a hybrid vehicle, comprising:
   determining, by a controller, whether an entry condition for a second mode based on a current is satisfied by receiving state information of an auxiliary battery while the LDC is being operated in a first mode based on a detected voltage;
   entering, by the controller, the second mode when the entry condition for the second mode is satisfied;
   calculating, by the controller, a charging current compensation value of the auxiliary battery; and
   operating, by the controller, the LDC based on the charging current compensation value of the auxiliary battery.

19. The method according to claim 18, further comprising:
   burst-controlling, by the controller, the LDC when a charging current integration value of the auxiliary battery is determined as being greater than a reference value while the LDC is being operated in the second mode; and
   releasing, by the controller, the burst-controlling of the LDC when a discharging current integration value of the auxiliary battery is determined as being less than a reference value while the LDC is in the burst-controlling.

20. The method according to claim 18, further comprising:
   determining, by the controller, whether entry release conditions for the second mode are satisfied while the LDC is being operated in the second mode; and releasing, by the controller, the second mode and operating the LDC in the first mode when at least one of the entry release conditions for the second mode is determined as being satisfied.

\* \* \* \* \*